United States Patent Office 3,436,268
Patented Apr. 1, 1969

3,436,268
FUEL CELL
Charles N. Satterfield, South Lincoln, and John O. Smith, Swampscott, Mass., and Kenneth L. McHugh, Kirkwood, Mo., assignors to Monsanto Research Corporation, St. Louis, Mo., a corporation of Delaware
No Drawing. Filed Dec. 21, 1962, Ser. No. 246,349
The portion of the term of the patent subsequent to May 24, 1983, has been disclaimed
Int. Cl. H01m 27/04, 29/00
U.S. Cl. 136—86                                4 Claims This invention relates to fuel cells and provides a new and valuable means for the direct conversion of chemical energy into electrical energy.

In prior art, such production of electrical energy has been generally accomplished by the provision of cells wherein there is utilized the chemical energy produced by the reaction of hydrogen or a carbonaceous fuel with oxygen or air. Whereas such reactions could be effected at ordinary or moderately elevated temperatures when the fuel was hydrogen, in order to employ carbonaceous fuels such as carbon, coal or methane, it has been necessary to employ very high temperatures, i.e., those attainable through molten salt mixtures. Accordingly, the art generally refers to hydrogen-oxygen cells as low temperature fuel cells and to the carbon-oxygen cells as high temperature fuel cells. The oxidizable component of the fuel cell is generally referred to as the fuel and the oxidizing component as the oxidant.

Numerous power applications, especially those of military nature, require high energy per unit weight power sources; and, in theory, the fuel cell is ideal for such applications. Since the weight of the fuel cell can be small compared to the weight of the fuel and oxidant, and because the cell can operate at up to 100% thermodynamic efficiency, fuel cells are a means by which the maximum theoretical energy-weight ratio of a chemical power source can be approached. There are limitations, however, on the type of fuel cell that can be used as a convenient and compact power source. The high temperature cells, of course, are inconvenient for field purposes and the use of hydrogen as fuel and oxygen as the oxidant present problems of unwieldly storage and cumbersome transportation. Since the weight of high pressure vessels is large, a gaseous fuel-oxidant system which requires storage at high pressure cannot be considered as either convenient or compact. Also, whereas in theory the use of air rather than of oxygen negates storage and transportation problems insofar as the oxidant is concerned, in practice, air is an inefficient oxidant component of fuel cells, at least with the ordinarily employed electrodes, because nitrogen accumulates in electrode pores and thereby reduces the rate at which oxygen can be transported to the active interface, whereby the discharge of electrons at the electrode is retarded and a marked decrease in power output results.

An object of the present invention is to provide an efficient and practical fuel cell. Another object of the invention is to provide a fuel cell which operates at ambient temperatures. Still another object of the invention is to provide an efficient, low-temperature fuel cell which employs an easily stored and handled oxidant.

These and other objects which will be hereinafter disclosed are provided by the invention wherein there is provided a low temperature fuel cell that employs a gaseous or liquid olefinic aliphatic hydrocarbon as the fuel and an easily stored and handled oxidant.

More particularly, the invention provides a fuel cell, operable at ambient temperature, and designed for the direct production of electrical energy from chemical energy by the reaction of a fuel and an oxidant therefor, said cell comprising a pair of spaced electrodes in contact with each other through an aqueous electrolyte, one of said electrodes being continuously maintained in contact with a mono-olefinic, aliphatic hydrocarbon of from 2 to 12 carbon atoms, while the other of said electrodes is being continuously maintained in contact with an oxidizing agent selected from the class consisting of hydrogen peroxide, reducible inorganic oxides and oxy acids, and the alkali metal and alkaline earth metal salts of said oxy acids. The invention thus provides also a method for conversion of chemical energy directly into electrical energy which comprises continuously introducing said olefin at one of said pair of electrodes while continuously introducing the oxidizing agent at the other of the pair of electrodes.

Presently useful olefins are, e.g., ethylene, propylene, pentene, hexene, heptene, octene, nonene, decene, undecene or dodecene. The olefinic double bond may be in any position and the olefin may be branched or unbranched. The 2 to 4 carbon olefins are preferred.

The olefin may be introduced into the cell either as a gas, a liquid, or in solution, e.g., dissolved in the aqueous electrolyte. For example, the olefin may be bubbled into the cell through a porous fuel electrode; or, in continuous operation, the electrolyte may be continuously removed from the cell, the olefin passed into the removed electrolyte and the resulting solution of olefin returned to the cell. In a wholly liquid system, the aqueous oxidant is introduced at the cathode, while the olefin either as a liquid or in solution, is introduced at the anode. When dilute aqueous solutions or dispersions of oxidizing agent are employed as the oxidant, it may be advantageous to add at the anode a solution of the olefin in the aqueous electrolyte while withdrawing electrolyte solution from the cell chamber. Undue dilution of the electrolyte within the cell is thus prevented.

The optimum quantity of olefin in the feed will be regulated, of course, to some extent, by other fuel cell factors, e.g., the nature and concentration of the electrolyte and of the material employed as the anode. These factors, of course, can be arrived at experimentally by one skilled in the art. Obviously, the rate at which input of olefin is conducted should correspond to the rate at which available oxygen is supplied by input of oxidant; and obviously, of course, the concentration of the electrolyte should be maintained at a value which maintains optimum ion transport. These factors can be determined by simply noting variation in the current output of the cell and by varying the concentration of fuel, oxidant and the electrolyte accordingly.

The rate and concentration of oxidant input will vary, of course, with that of the olefin and be in proportion thereto stoichiometrically. Generally, the oxidation proceeds to completion, the products originating from, e.g., ethylene, being carbon dioxide and water. At all but the lowest current densities, when acidic or neutral media are used, bubbles of carbon dioxide are evidenced at a rate that appears to be proportional to the current developed. In basic solutions the evolved carbon dioxide forms carbonates.

In the presently provided fuel cell, it is believed that electrical energy is provided by reaction of the olefin, e.g., ethylene, propylene or 1- or 2-butene, at the anode to give intermediate oxidation products, positively charged hydrogen ions, and electrons which are provided to the load. The intermediate oxidation products progressively react at the electrode to give more positively charged hydrogen ions and more electrons to the load until, as the final product of oxidation, carbon dioxide is formed.

The electrons travel through the load and arrive at the cathode while the aqueous oxidant is being added thereto in the presence of the electrolyte. Hydroxyl ions are thus formed. Inorganic reducible oxides or oxy acids or the alkali metal or alkaline earth metal salts of the oxy acids also lose oxygen at the cathode in presence of a non-acidic electrolyte to yield hydroxyl ions which combine with the hydrogen ions evolved from the alkene at the anode.

The term "reducible oxides and oxy acids," as herein employed, means reducible compounds having one or more oxygen atoms, including peroxides, superoxides and peroxy acids. Examples of such presently useful compounds, in addition to hydrogen peroxide, are the oxy acids such as nitric, nitrous, sulfuric, persulfuric and perphosphoric acids; oxides, peroxides and superoxides such as $NO$, $NO_2$, $N_2O_3$, $N_2O_5$, $Na_2O_2$, $KO_2$, $K_2O_3$, $NaO_2$, $K_2O_2$, $SrO_2$, $BaO_2$, $CaO_2$, $CrO_2$, $CrO_3$, $V_2O_5$, $SO_2$, $SeO_2$, $TeO_2$, $TeO_3$, $MoO_2$, $Mo_2O_5$, $MoO_3$, $WO_2$, $W_2O_5$, $WO_3$, $Mn_3O_4$, $Mn_2O_3$, $MnO_2$, $MnO_3$, $MnO_5$, $Mn_2O_7$, $Fe_2O_3$, $Co_2O_3$, $Ni_2O_3$, $Ni_3O_4$, etc. The useful alkali metal or alkaline earth metal salts of the oxy acids are e.g., sodium, potassium, lithium, rubidium, cesium, barium, calcium or magnesium chromates, dichromates, polychromates, persulfates, perphosphates, molybdates or dimolybdates or the hydrates of tetra-, octa-, or decamolybdates, tungstates or paratungstates or the hydrates thereof, manganates or permanganates or the hydrates thereof, ferrites, ferromolybdates, ferrotungstates, etc. Aqueous solutions or dispersions of varying concentrations of the oxidizing agent in sufficient quantity to supply the stoichiometrically required amount of oxygen, with respect to the fuel, are used.

Acidic, basic or neutral electrolytes commonly used in electrolytic processes are generally useful for the present purpose. These may be used, e.g., aqueous solutions of sodium, potassium, lithium, magnesium, or barium hydroxides and the chlorides thereof; potassium, sodium, or lithium sulfate or carbonate, or bicarbonate, sulfuric acid, p-toluenesulfonic acid, phosphoric acid, hydrochloric acid, etc. As is known to the art, the electrical conductivity of aqueous solutions generally is a function of the concentration of the electrolyte, the conductivity usually reaching a maximum at a certain concentration which may be different for each electrolyte. Accordingly, in order to maintain continuous, effective operation of the fuel cell, detrimental dilution of the electrolyte by water of reaction and/or any other products should be avoided by providing for their removal from the cell. The removal of water for the purpose of maintaining constant cell operation are matters of engineering expediency which have been resolved in known manner for other fuel cells wherein water is a by-product. For example, water may be removed by boiling, freezing, drying over alumina, etc., in order to reconcentrate the electrolyte. Gaseous waste products, if any, can be readily removed by venting; and insoluble products, e.g., precipitates of metal which may be formed by use, as oxidant, of the metal oxides or salts of the oxy acids of metals, are readily removable by filtering, settling or decanting.

The electrodes, which are spaced apart in the electrolyte, comprise a fuel electrode, which is herein referred to as an anode, and the oxidant electrode, herein referred to as the cathode. Both electrodes may be cylindrical or rectangular bars or plates of plain or porous structure which may be of carbon, pressed and molded metallic particles of powdered metals, e.g., nickel, platinum, silver, gold, cadmium, Raney nickel-aluminum alloy, magnesium, zinc or silicon. Advantageously, they may comprise a carrier skeleton, e.g., of carbon, sintered stainless steel, fritted glass, or metal gauze, having coated thereupon or imbedded therein, catalysts such as palladium, gold, platinum, silver or iridium. The requirement that the cell be stable over long periods of time excludes, of course, electrode materials which are known to be attacked by the particular type of electrolyte in use. For example, since the chloride ion reacts with even those metals which are usually considered to be inert, chlorides are generally of little utility as electrolytes in fuel cells which employ metal electrodes. Chloride electrolytes may be used with inert materials such as carbon.

The electrodes may be conveniently hollowed for easy introduction of the fuel and oxidant into the cell. Thereby, these components diffuse through the porous electrode structure to the electrode surface where reaction takes place. However, the fuel and the oxidant may also be mechanically impinged upon the electrode surface. Conveniently, also, the fuel and the oxidant may be dissolved in the aqueous electrolyte and the resulting solutions of electrolyte and reactant may be added at the respective electrodes while removing excess aqueous electrolyte from the cell. This expedient permits maintenance of the electrolyte at substantially constant concentrations in the cell while facilitating ion transport.

While the choice of electrode will depend to some extent upon the nature of the electrolyte and of the oxidant, we have found that generally the conventional carbon or nickel-aluminum alloy electrodes serve satisfactorily as either anodes or cathodes. While improvement in current output usually can be obtained by coating or impregnating such electrodes with catalysts known to promote oxidation and reduction reactions such as platinum, silver, palladium, etc., judicious choice of catalyst is again controlled by factors such as nature of electrolyte, oxidant, rate of feed, proportion of fuel to catalyst, etc., which factors can be arrived at by routine experimentation and are not controlling upon the present invention, i.e., the production of electrical energy from aliphatic mono-olefin and an aqueous oxidant in the presence of an electrolyte.

The invention is further illustrated by, but not limited to, the following example.

EXAMPLE 1

This example shows a fuel cell wherein propylene is employed as the fuel, chromic acid ($CrO_3$) is used as oxdiant, and platinized carbon is used for both electrodes.

Each of the two 1" x 1" x 4" carbon electrodes had at its center a circular aperture, 0.5" in diameter, longitudinally disposed therein to within 0.5" of the end of the electrode. One longitudinal face of each electrode had a thin coating of platinum deposited thereon. With the open ends up, the electrodes were immersed, at a spaced distance from each other and with the coated surfaces facing each other, into a glass receptacle container containing the electrolyte. The latter, 90% aqueous sulfuric acid, was prepared by adding 42 mls. of water to 200 mls. of concentrated sulfuric acid. A solution consisting of about 8 g. of propylene in 300 g. of concentrated sulfuric acid was continuously introduced, dropwise, into the aperture of the anode, and a solution consisting of 10 g. of the chromic acid in 186 g. of concentrated sulfuric acid was added simultaneously and in the same manner into the cathode. A voltage of about 0.6 volts was noted almost immediately. After operation for about 2 hours, there was determined a voltage of 0.62 and a current output of 84 milliamperes. Use of ethylene or 2-butene, instead of propylene, gives similar results.

The above example shows the efficiency of the lower olefins as fuels in a cell employing acidic oxidant material and an acidic electrolyte. Instead of employing acidic materials for this purpose, alkaline oxidants and alkaline electrolytes may be used. The oxidant, the electrolyte and electrodes may be widely varied, as hereinbefore disclosed.

The presently provided fuel cells operate at all temperatures between the boiling point of the electrolyte, on the one hand, and the freezing points of the electrolyte and of the feed on the other. Between these limits, the short-term behavior of the cell improves noticeably with increasing temperature. In the region of the boiling point, however, performance declines significantly as a result of formation of vapor bubbles on the electrode surface. Generally, neither external heating nor cooling will be required, but the entire cell may be cooled or warmed, if desired, by a jacket containing a coolant or a heat-transfer medium, and both the anode and cathode may be equipped with condensers. However, operation of the cell generally results in no substantial temperature increase.

Stirring of the electrolyte during cell operation may be advantageous if heat dissipation is advisable; frequently, stirring of the electrolyte will facilitate ion transfer. Stirring, if desired, may be conducted by mechanical or magnetic means.

Specific conditions of cell operation will vary, of course, with different cell structures and with surface area of electrodes, as well as with the other variables already mentioned. The details of cell housing, electrode structure, etc, are not critical in carrying out operation of the cell, and the cell may be altered in numerous ways, so long as there is employed the olefin feed, the liquid oxidant and the electrolyte. Also, any number of cells can be combined into a single unit. The production of electrical energy can be carried out continuously, e.g., by means of a circulating pump, whereby the electrolyte is withdrawn from the cell for revivification if desired by separating the reaction products therefrom, and the revivified electrolyte is reintroduced into the cell continuously, together with the feed, or separately.

With some electrolytes and with some oxidants it may be advantageous to divide the cell into a cathode compartment and an anode compartment. This may be done by means of a diaphragm which may be a porous, porcelain structure of a permeable membrane. An ion-exchange resinous material may serve as such membrane, and the nature of the electrolyte adjusted accordingly.

Use of liquid fuel and liquid oxidant permits substantially more simple cell construction than is required for cells employing gaseous feed and at the same time provides a highly efficient means of converting chemical energy into electrical energy. While the invention has been described herein in detail with reference to the specific embodiments shown and the alternatives thereto, various other changes and modifications will become apparent to the artisan which fall within the spirit of the invention and the scope of the following claims.

We claim:
1. The process for conversion of chemical energy directly into electrical energy which comprises continuously introducing an aqueous solution of mono-olefinic aliphatic hydrocarbon of 2 to 4 carbon atoms as fuel at one of a pair of spaced electrodes, which electrodes are in electrical contact with each other through an undivided aqueous electrolyte, while continuously introducing at the other of said pair of electrodes an aqueous solution of oxidizing agent selected from the class consisting of hydrogen peroxide, reducible inorganic oxides and oxy acids, and the alkali metal and alkaline earth metal salts of said oxy acids.

2. The process defined in claim 1, further limited in that the fuel is propylene.

3. The process of claim 1, further limited in that the oxidizing agent is chromic acid.

4. The process of claim 1, further limited in that the fuel is propylene, the oxidizing agent is chromic acid and the electrolyte is aqueous sulfuric acid.

References Cited

UNITED STATES PATENTS

| | | | |
|---|---|---|---|
| 2,901,523 | 8/1959 | Justi et al. | 136—86 |
| 2,921,111 | 1/1960 | Crowly et al. | 136—86 |
| 3,160,528 | 12/1964 | Dengler et al. | 136—86 |
| 3,163,560 | 12/1964 | Grimes | 136—86 |
| 3,178,315 | 4/1965 | Worsham | 136—86 |
| 3,245,890 | 4/1966 | Klass | 136—86 |

OTHER REFERENCES

Rose, "The Condensed Chemical Dictionary," sixth edition, Reinhold Publishing Co., 1961, p. 272.

WINSTON A. DOUGLAS, *Primary Examiner.*

H. FEELEY, *Assistant Examiner.*